United States Patent
Kim et al.

(10) Patent No.: US 10,628,999 B2
(45) Date of Patent: Apr. 21, 2020

(54) METHOD AND APPARATUS WITH GRID-BASED PLANE ESTIMATION

(71) Applicant: SAMSUNG ELECTRONICS CO., LTD., Suwon-si (KR)

(72) Inventors: Jiyeon Kim, Hwaseong-si (KR); Seungin Park, Yongin-si (KR); Minsu Ahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/988,383

(22) Filed: May 24, 2018

(65) Prior Publication Data

US 2019/0197772 A1    Jun. 27, 2019

(30) Foreign Application Priority Data

Dec. 27, 2017  (KR) .................. 10-2017-0180641

(51) Int. Cl.
| | |
|---|---|
| *G06K 9/00* | (2006.01) |
| *G06T 17/20* | (2006.01) |
| *G06T 19/00* | (2011.01) |
| *G06T 7/50* | (2017.01) |
| *G06T 7/73* | (2017.01) |
| *G06K 9/62* | (2006.01) |

(52) U.S. Cl.
CPC .......... *G06T 17/20* (2013.01); *G06K 9/00201* (2013.01); *G06K 9/00624* (2013.01); *G06K 9/6284* (2013.01); *G06T 7/50* (2017.01); *G06T 7/73* (2017.01); *G06T 19/006* (2013.01); *G06K 9/00671* (2013.01)

(58) Field of Classification Search
CPC .......... G06K 9/00201; G06K 9/00624; G06T 17/20; G06T 19/006; G06T 7/50; G06T 7/73

See application file for complete search history.

(56) References Cited

U.S. PATENT DOCUMENTS

| | | |
|---|---|---|
| 7,586,489 B2 | 9/2009 | Muller-Fischer et al. |
| 8,660,365 B2 | 2/2014 | Lukas et al. |
| 9,412,040 B2 | 8/2016 | Feng et al. |

(Continued)

FOREIGN PATENT DOCUMENTS

| | | |
|---|---|---|
| KR | 10-2007-0089501 A | 8/2007 |
| KR | 10-2013-0006690 A | 1/2013 |
| KR | 10-1551739 B1 | 9/2015 |

*Primary Examiner* — Sing-Wai Wu
(74) *Attorney, Agent, or Firm* — NSIP Law

(57) ABSTRACT

A processor-implemented method of estimating a plane includes dividing a target image into a plurality of grid cells, estimating an initial plane based on reference feature points comprising a reference feature point selected from each of the plurality of grid cells, classifying each feature point of feature points extracted from the target image as being an inlier located on the same plane as the initial plane or an outlier located on a plane different from the initial plane, selecting boundary grid cells from the plurality of grid cells based on a distribution of the inliers and the outliers from among the feature points, and estimating an expanded plane associated with the initial plane based on the selected boundary grid cells for use in identifying boundaries of a planar surface presented in a scene corresponding to the target image.

25 Claims, 11 Drawing Sheets

(56) References Cited

U.S. PATENT DOCUMENTS

| | | |
|---|---|---|
| 9,514,574 B2 | 12/2016 | Reitmayr |
| 9,595,125 B2 | 3/2017 | Pan et al. |
| 2005/0253843 A1 | 11/2005 | Losasso Petterson et al. |
| 2011/0102545 A1 | 5/2011 | Krishnaswamy et al. |
| 2013/0034171 A1* | 2/2013 | Winken ............... H04N 19/597 |
| | | 375/240.25 |

\* cited by examiner

1100

METHOD AND APPARATUS WITH GRID-BASED PLANE ESTIMATION

CROSS-REFERENCE TO RELATED APPLICATIONS

This application claims the benefit under 35 USC 119(a) of Korean Patent Application No. 10-2017-0180641 filed on Dec. 27, 2017 in the Korean Intellectual Property Office, the entire disclosure of which is incorporated herein by reference for all purposes.

BACKGROUND

1. Field

The following description relates to a method and apparatus with grid-based plane estimation.

2. Description of Related Art

Plane estimation is a scheme for identifying a plane region from an input image. For example, a plane corresponding to a desk region portrayed in a picture may be identified from an input image through the plane estimation, and may be used to acquire a structural feature of objects appearing in the input image. Also, the estimated plane may be used in a representing and facilitating of an interaction between a virtual object and a real object in augmented reality (AR) applications. AR may be a technique for displaying a real world while overlapping the real world and the virtual object. In the AR, a plane boundary may need to be accurately estimated to represent the virtual object at an appropriate position with respect to the real world.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of estimating a plane includes dividing a target image into a plurality of grid cells, estimating an initial plane based on reference feature points comprising a reference feature point selected from each of the plurality of grid cells, classifying each feature point of feature points extracted from the target image as being an inlier located on the same plane as the initial plane or an outlier located on a plane different from the initial plane, selecting boundary grid cells from the plurality of grid cells based on a distribution of the inliers and the outliers from among the feature points, and estimating an expanded plane associated with the initial plane based on the selected boundary grid cells for use in identifying boundaries of a planar surface presented in a scene corresponding to the target image.

The scene corresponding to the target image may be a scene in an augmented reality.

The method may further include displaying a virtual object on the planar surface in the scene corresponding to the target image based on the expanded plane.

The method may further include extracting the feature points from the target image, and controlling a distribution of the extracted feature points.

The controlling of the distribution of the extracted feature points may include identifying a grid cell having an unbalanced distribution from the plurality of grid cells, dividing the identified grid cell into multiple grid cells, and re-extracting feature points from the multiple grid cells.

The estimating of the initial plane may include sampling grid cells from among the plurality of grid cells, selecting a reference feature point from each of the sampled grid cells, and estimating, as the initial plane, a plane having the selected reference feature points as vertices.

The estimating of the initial plane may include determining a first plane based on the reference feature points comprising a reference feature point selected from each of the plurality of grid cells, determining a second plane based on feature points of a reference image corresponding to the reference feature points, determining a transformation function between the first plane and the second plane, determining projection points on the second plane by projecting first feature points on the first plane onto the second plane based on the transformation function, and estimating the first plane as the initial plane based on differences between the determined projection points and second feature points corresponding to the first feature points on the second plane.

The target image may correspond to a first frame from among a plurality of frames of an input image, and the reference image may correspond to a second frame from among the plurality of frames of the input image.

The target image may correspond to an image captured at a first capturing position of a stereo image, and the reference image may correspond to an image captured at a second capturing position of the stereo image.

The boundary grid cells may include any one or any combination of any two or more of a first-type grid cell including an inlier and an outlier, a second-type grid cell in contact with a grid cell including an outlier from among grid cells including an inlier, and a third-type grid cell in contact with a grid cell including an inlier from among grid cells including an outlier.

The estimating of the expanded plane may include estimating a boundary line in the selected boundary grid cells, and estimating the expanded plane based on the estimated boundary line.

The boundary line may be estimated based on any one or any combination of any two or more of depth information, intensity information, and color information of pixels in the selected boundary grid cells.

The method may further include removing each inlier from the target image, and deactivating grid cells including each inlier from among the plurality of grid cells.

The method may further include estimating a second initial plane based on remaining feature points excluding each removed inlier, classifying each of the remaining feature points as being an inlier or an outlier associated with the second initial plane, selecting second boundary grid cells from activated grid cells based on a distribution of the inliers and the outliers associated with the second initial plane, and estimating a second expanded plane based on the second boundary grid cells.

The method may further include estimating a second initial plane based on the outliers, selecting second boundary grid cells based on a distribution of inliers and outliers associated with the second initial plane, and estimating a second expanded plane based on the second boundary grid cells.

In another general aspect, a non-transitory computer-readable storage medium stores instructions that, when executed by a processor, cause the processor to perform the method described above.

In another general aspect, an apparatus for estimating a plane includes a processor configured to divide a target image into a plurality of grid cells, estimate an initial plane based on reference feature points comprising a reference feature point selected from each of the plurality of grid cells, classify feature points extracted from the target image as being an inlier located on the same plane as the initial plane or an outlier located on a plane different from the initial plane, select boundary grid cells from the plurality of grid cells based on a distribution of the inliers and the outliers from among the feature points, and estimate an expanded plane associated with the initial plane based on the selected boundary grid cells for use in identifying a planar surface presented in a scene corresponding to the target image.

The apparatus may further include a memory storing instructions, which when executed by the processor, cause the processor to implement the dividing of the target image, the estimation of the initial plane, the classification of the feature points, the selection of the boundary grid cells, and the estimation of the expanded plane.

The scene corresponding to the target image may be a scene in an augmented reality.

The processor may be further configured to display a virtual object on the expanded plane in the scene corresponding to the target image based on boundaries of the expanded plane.

The processor may be configured to estimate the initial plane by determining a first plane based on the reference feature points comprising a reference feature point selected from each of the plurality of grid cells, determining a second plane based on feature points of a reference image corresponding to the reference feature points, determining a transformation function between the first plane and the second plane, determining projection points on the second plane by projecting first feature points on the first plane onto the second plane based on the transformation function, and estimating the first plane as the initial plane based on differences between the determined projection points and second feature points corresponding to the first feature points on the second plane.

The boundary grid cells may include any one or any combination of any two or more of a first-type grid cell including an inlier and an outlier, a second-type grid cell in contact with a grid cell including an outlier from among grid cells including the inlier, and a third-type grid cell in contact with a grid cell including an inlier from among grid cells including the outlier.

The processor may be configured to estimate the expanded plane by estimating a boundary line in the selected boundary grid cells, and estimating the expanded plane based on the estimated boundary line.

The boundary line may be estimated based on any one or any combination any two or more of depth information, intensity information, and color information of pixels in the selected boundary grid cells.

In another general aspect, a processor-implemented method of estimating a plane includes estimating an initial plane based on reference feature points, comprising a reference feature point selected from each of a plurality of grid cells, wherein the grid cells are obtained by division of a target image, selecting boundary grid cells from the plurality of grid cells based on a distribution of inliers and the outliers classified from among feature points extracted from the target image, wherein inliers are located on the same plane as the initial plane and outliers are located on a plane different from the initial plane, and estimating an expanded plane associated with the initial plane based on the selected boundary grid cells for use in identifying boundaries of a planar surface presented in a scene corresponding to the target image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
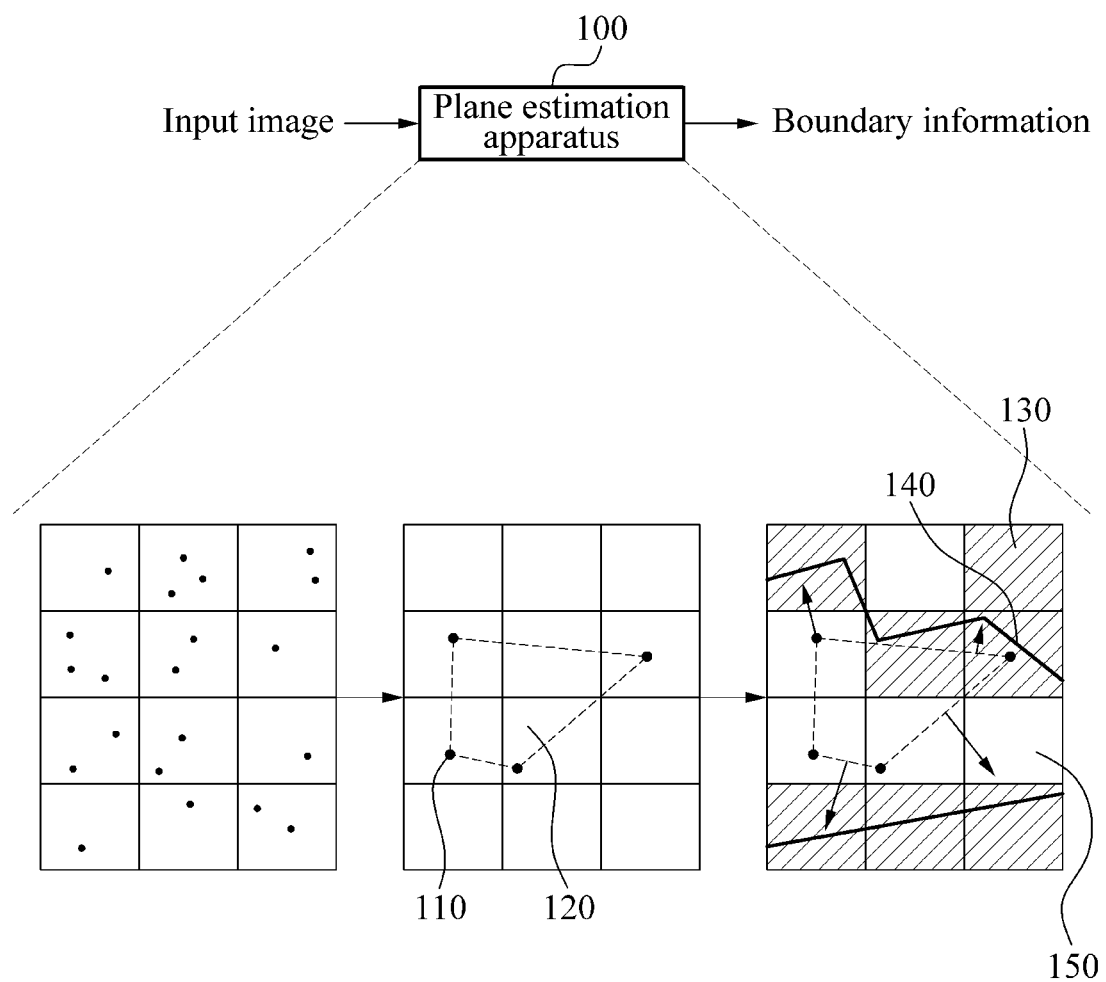
FIG. 1 illustrates an example of an operation of an apparatus with plane estimation.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains after an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

FIG. 1 illustrates an example of an operation of an apparatus with plane estimation. Referring to the example of FIG. 1, an apparatus 100 receives an input image and outputs boundary information that indicates a boundary of a plane in the input image. Below, though the apparatus 100 is not limited to plane estimation, merely for simplicity of explanation, the apparatus 100 will be referred to as the plane estimation apparatus 100.

The plane estimation apparatus 100 divides a target image into a plurality of grid cells and extracts feature points from the target image. The plane estimation apparatus 100 classifies the extracted feature points for each of the grid cells. The target image is, for example, a portion of the input image. When the input image is a mono image including a plurality of frames, the target image is a frame from among the plurality of frames. A mono image is an abbreviation of monochrome image, and means that the image is an image in one color, such as black, or shades of such an image, such as gray.

The plane estimation apparatus 100 selects grid cells from the plurality of grid cells and selects a reference feature point 110 from each of the selected grid cells. For example, the plane estimation apparatus 100 randomly selects a number of grid cells that corresponds to a first value. The first value is determined in advance of the operation of the plane estimation apparatus 100. In the example of FIG. 1, the first value has a predetermined value of 4. The plane estimation apparatus 100 randomly selects a number of reference feature points corresponding to a second value from each of the selected grid cells. The second value is also determined in advance of being used by the plane estimation apparatus 100. In the example of FIG. 1, the second value has a predetermined value of 1. Also, in examples, a quantity of reference feature points corresponding to a result of multiplication, that is, a product, of the first value and the second value may be selected. Accordingly, the second value is set to be sufficiently small to achieve a balance of factors leading to successful performance in determining a region in which the initial plane is estimated. Thus, the plane estimation apparatus 100 estimates an initial plane 120 based, at least in part, on the reference feature point 110. A plane having the reference feature point 110 as a vertex is estimated to be the initial plane 120.

The plane estimation apparatus 100 selects a boundary grid cell 130 based on the selected initial plane 120. Therefore, the plane estimation apparatus 100 classifies each of the feature points in the target image as being an inlier located on the same plane as the initial plane 120, or an outlier located on a plane different from the initial plane 120. The plane estimation apparatus 100 selects the boundary grid cell 130 based on a distribution of the feature points as being inliers and outliers. For example, the plane estimation apparatus 100 selects any one or any combination of any two or more of a first-type grid cell including an inlier and an outlier, a second-type grid cell in contact with a grid cell including an outlier from among grid cells including an inlier, and a third-type grid cell in contact with a grid cell including an inlier from among grid cells including an outlier, as the boundary grid cell 130.

The plane estimation apparatus 100 estimates an expanded plane 150 associated with the initial plane 120 based on the boundary grid cell 130. The plane estimation apparatus 100 estimates a boundary line 140 in the boundary grid cell 130 and then estimates the expanded plane 150 based on the boundary line 140. The plane estimation apparatus 100 subsequently outputs boundary information indicating the expanded plane 150. The boundary information includes, for example, coordinate values of pixels corresponding to the estimated boundary line 140.

In an example, the boundary information derived by the plane estimation apparatus 100 is used in the controlling and facilitating of an augmented reality (AR) by the plane estimation apparatus 100. The boundary information is used to arrange a virtual object in the AR when displaying the virtual object. Accordingly, the virtual object is arranged on a plane estimated based on the boundary information. When the virtual object is located at an edge of the estimated plane, a motion of the virtual object falling down may be produced. Also, the boundary information is used by the plane estimation apparatus 100 to emphasize a boundary of a real object and/or to apply a texture to a surface of the real object. Because the boundary of the real object is identified based on the boundary information, a boundary of a real object that a user is interested in, a real object that is dangerous to the user, or a real object corresponding to additional information provided by the AR may be emphasized or a texture may be applied to a surface thereof. Such virtual or AR apparatuses may also be implemented by the processor 1130 of FIG. 11, which may include or be representative of the plane estimation apparatus 100.

In another example, the boundary information is used to help allow an artificial intelligence (AI) robot to identify nearby objects. The AI robot schedules a motion path of a robot on a plane estimated based on the boundary information. For example, the robot may recognize an edge of a currently located plane and change a path it follows accordingly, or set a motion path by verifying a positional relationship between the currently located plane and an adjacent plane. Also, the boundary information is used to identify a plane or use the identified plane in other contexts with respect to the motion of objects across the plane. In this example, the AI robot may be represented by the apparatus 1100 of FIG. 11, and such analyses or control operations performed by the processor 1130, which may include the various operations performed by the AI robot as discussed above, such as scheduling the motion path of the robot on the plane estimated based on the boundary information, such as by using edge recognition or a positional relationship between planes.

In keeping with the above examples, it is noted that a plane estimation method and a corresponding plane estimation apparatus, or apparatus with plane estimating, are directed towards providing a technical solution for a technical problem. By improving the ability of a computer to identify the presence and boundaries of a plane in a target image, examples provide a technical solution to a technical problem that arises in computing and in the related areas of image analysis, and at least in the aforementioned example technological fields of virtual reality (VR), AR, and locator mapping and object avoidance hardware implementations. Additionally, the results provided by examples clearly lend themselves to identifying three-dimensional aspects of real-world scenes corresponding to images.

Accordingly, such information lends itself to improved interaction between the recipient of the information and the real world, whether the tasks in question are display, movement, or other tasks where knowing the three-dimensional structure is helpful. For example, such information could be helpful when emitting sound signals, in that the information could be used for improved acoustic performance. This is only one additional example, and other examples of how to use the information about plane location exist and may be recognized to fall within the scope of this disclosure.

Applicants also note that the plane estimation method and the plane estimation apparatus, or apparatus with plane estimation, are specifically directed to using a plane estimation approach that is adapted to operating in a computing environment. The provided approach provides a method and an apparatus to efficiently derive information about the location of a plane that would not otherwise be available to a computer. Additionally, a human being would not use the disclosed approaches to analyze an image in the manner used in examples as a way of plane estimation, and such solution, provided herein by the plane estimation apparatus would only occur in the computing environment.

Figure 2:
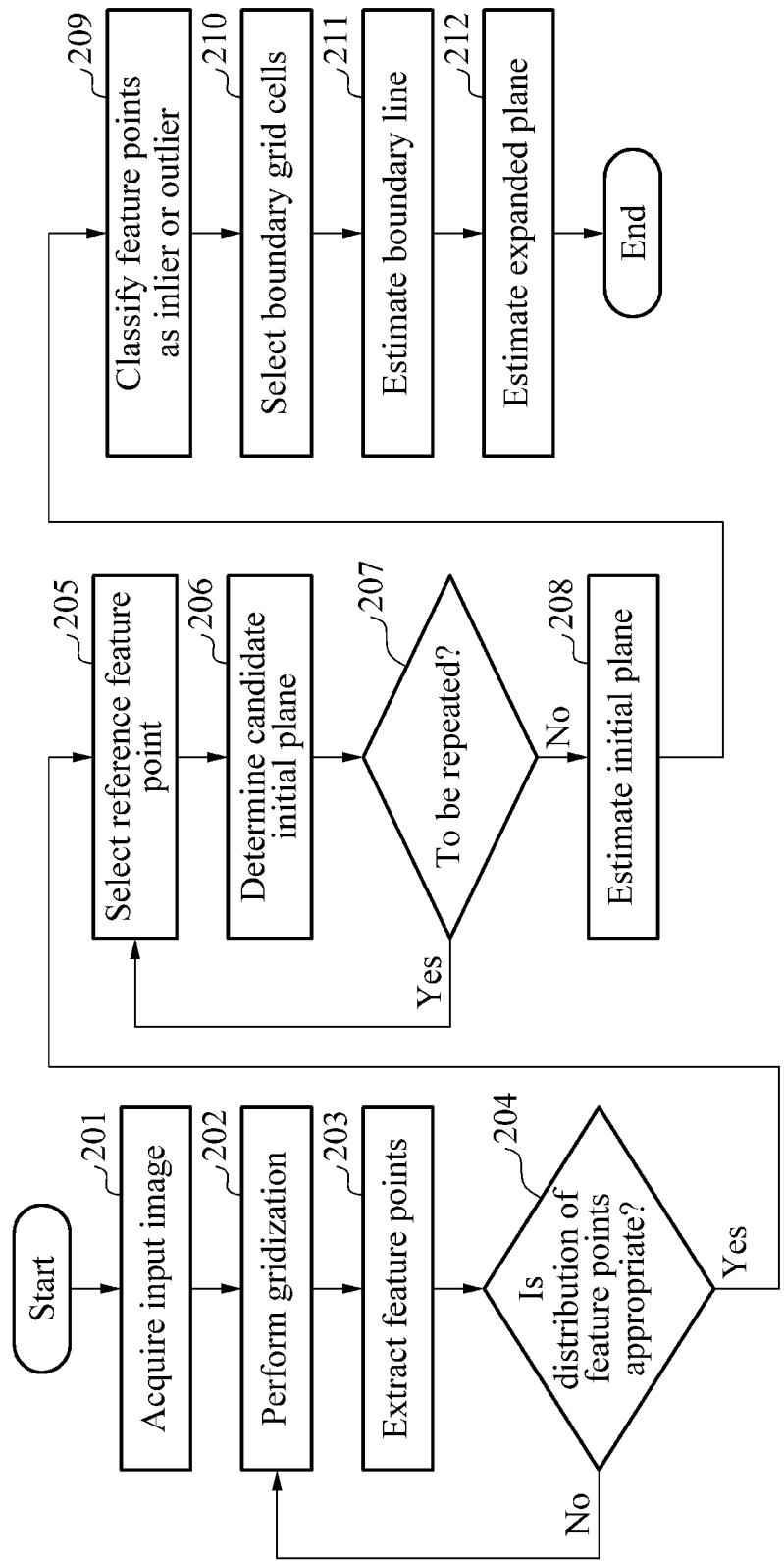
FIG. 2 illustrates an example of a plane estimation method.

FIG. 2 illustrates an example of a plane estimation method. Referring to the example of FIG. 2, in operation 201, a plane estimation apparatus acquires an input image. With respect to the example of FIG. 2 and the discussion of FIG. 2, the plane estimation method refers to a plane estimation apparatus, as well as certain related features that are discussed further with respect to FIG. 1, above, and FIG. 11, below. Additionally, other aspects of the method are discussed in greater detail in FIGS. 3-9. Hence, it will be realized that examples exist where the discussion of how these features from FIGS. 1 and 3-11 apply to similar features in FIG. 2, but examples of FIG. 2 is not to be limited to the discussion of the features presented in FIG. 1 or with respect to features discussed with respect to FIGS. 3-9.

The input image includes a target image and a reference image and is acquired using at least one camera. The plane estimation apparatus estimates a plane in the target image using the reference image. For example, aspects of estimating such a plane are discussed further, above, with respect to FIG. 1.

The at least one camera is, for example, a mono camera. The mono camera generates a mono image including a plurality of frames and provides the mono image to the plane estimation apparatus as the input image for use in plane estimation. In this example, a first frame of the plurality of frames in the input image corresponds to the target image used in plane estimation. Also, a second frame of the plurality of frames in the input image corresponds to the reference image used in plane estimation. In examples, the first frame and the second frame may be continuous frames or discontinuous frames.

To determine whether a feature point is located on a predetermined plane, three dimensional (3D) coordinates of the feature point are required. Thus, the reference image is used to acquire the 3D coordinates of the feature point. In general, a depth camera or a stereo camera may be used to acquire the 3D coordinates. For example, a depth camera may be configured to measure depth directly, while a stereo camera may be configured to compare images acquired by multiple cameras with known positions and fields of view, and by such comparison yield depth information. Accordingly, the plane estimation apparatus uses the plurality of frames of the mono camera to acquire the 3D coordinates. The plane estimation apparatus acquires 3D information of feature points by comparing a first feature point in the first frame to a second feature point corresponding to the first feature point in the second frame.

In an example, the at least one camera is a stereo camera. In such an example, the stereo camera includes a first camera and a second camera spaced apart from each other. Because the first camera and the second camera have known positions, it is also known how images acquired by each camera will differ when the images correspond to the same subject. The stereo camera generates a stereo image including a plurality of frames and provides the stereo image to the plane estimation apparatus as the input image. More particularly, as discussed further, above, a first image of the stereo image captured by the first camera corresponds to the target image. Likewise, a second image of the stereo image captured by the second camera corresponds to the reference image. The plane estimation apparatus acquires 3D information of feature points by comparing a first feature point of the first image to a second feature point corresponding to the first feature point in the second image. As discussed above, when the location of a feature point is identified in each of the first and second image, methods known in the art allow deduction of the desired 3D information.

In an example, the at least one camera includes a color camera and a depth camera. In this example, a color image of the color camera corresponds to the target image. Furthermore, the color camera captures color data with respect to the target image, so that the target image captured by the color camera is not limited to being of one color or shades of such a color, but may include, for example, combinations of red, green, and/or blue, as well as various shades of such colors. Also, a depth image of the depth camera corresponds to the reference image. The plane estimation apparatus acquires 3D information of feature points in the color image based on depth information of the depth image, acquired as discussed further, above.

In operation 202, the plane estimation apparatus performs gridization by dividing the target image into a plurality of grid cells. A number of grid cells, into which the target image is divided, is adjusted based on a characteristic of an application using the estimated plane. For example, with respect to an application including a wide plane, such as an object captured having a short distance, the number of grid cells may decrease and a size of the grid cell may increase accordingly. Also, with respect to an application including a narrow plane, such as an object captured having a long distance, the number of grid cells may increase and a size of the grid cells may decrease. Thus, the plane estimation apparatus receives information associated with the characteristics of the application or a value set for the number of grid cells, thereby adjusting the number of grid cells to be an appropriate number based on such considerations.

In operation 203, the plane estimation apparatus extracts feature points from the target image. When a value corresponding to a shape formed by predetermined pixels is greater than a threshold, feature points corresponding to the pixels are extracted. In this example, a number of the extracted feature points increases as the threshold decreases. Therefore, the plane estimation apparatus adjusts the threshold to obtain an appropriate number of feature points to ensure its successful operation. When the feature points are extracted from the target image, the plane estimation apparatus matches the extracted feature points to corresponding points of the reference image and performs classification for each of the grid cells including the extracted feature points. The matching feature points and the corresponding points are physically the same with respect to the physical portions of the subject they represent. Thus, feature points of the target image that do not match the corresponding points of the reference image are removed from the target image to facilitate the plane estimation.

It is to be noted that a sequence of operations 202 and 203 may be changed depending on an example. Although FIG. 2 illustrates an ordering in which the feature points are extracted after the gridization, the gridization may also be performed after the feature points are extracted.

In operation 204, the plane estimation apparatus determines whether a distribution of the feature points is appropriate. When it is determined that the distribution of the feature points is appropriate, operation 205 is performed. When it is determined that the distribution of the feature points is inappropriate, operation 204 is performed. For example, when a predetermined grid cell has an unbalanced distribution, the plane estimation apparatus determines that a distribution of feature points in a corresponding grid cell is inappropriate and controls the distribution of the feature points in the corresponding grid cell. Such an unbalanced distribution includes a distribution in which feature points are concentrated on one side in a grid cell. To control the distribution of the feature points, the plane estimation apparatus identifies a grid cell having the unbalanced distribution from among the plurality of grid cells in operation 204, divides the identified grid cell into multiple grid cells in operation 202, and re-extracts feature point from the multiple grid cells in operation 203. Thus, the gridization performed in step 202 and the extraction of feature points performed in step 203 occur repeatedly in whichever order is used in a given example until an appropriate distribution of feature points is achieved.

Figure 3:
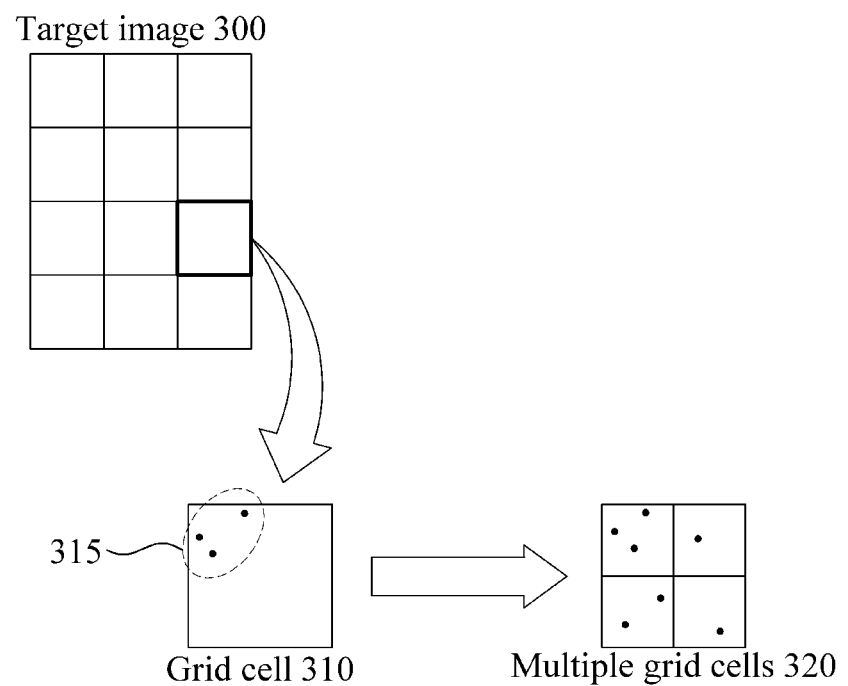
FIG. 3 illustrates an example of generating multiple grid cells.

FIG. 3 illustrates an example of generating multiple grid cells. Referring to the example of FIG. 3, an unbalanced distribution 315 is present in a grid cell 310 of a target image 300. The unbalanced distribution 315 is readily seen to be unbalanced because all three of the points in grid cell 310 are clustered in one corner of the grid cell 310. A plane estimation apparatus identifies the grid cell 310 having the unbalanced distribution 315 from a plurality of grid cells in the target image 300 and divides the grid cell 310 into multiple grid cells 320. Then, the plane estimation apparatus re-extracts feature points from the multiple grid cells 320. As a part of re-extracting feature points from the multiple grid cells 320, for grid cells from which feature points are not extracted from among the multiple grid cells 320, the plane estimation apparatus adjusts a threshold for extracting the feature points to be reduced from its previous value. In response to the threshold being adjusted, feature points are extracted from the grid cells from which feature points have not been extracted previously.

Referring back to the example of FIG. 2, in operation 205, the plane estimation apparatus selects a reference feature point. The plane estimation apparatus selects grid cells from the plurality of grid cells and selects a reference feature value from each of the selected grid cells. The plane estimation apparatus randomly selects a number of grid cells corresponding to a first value and randomly selects a number of reference feature values corresponding to a second value for each of the grid cells. Thus, a number of reference feature values corresponding to product that is a result of multiplication of the first value and the second value are selected.

In operation 206, the plane estimation apparatus determines a candidate initial plane. When a plane having the reference feature points as vertices is a reference plane, the reference plane is determined to be the candidate initial plane in response to feature points of the reference plane being verified to be located within a threshold distance from the reference plane.

Figure 4:
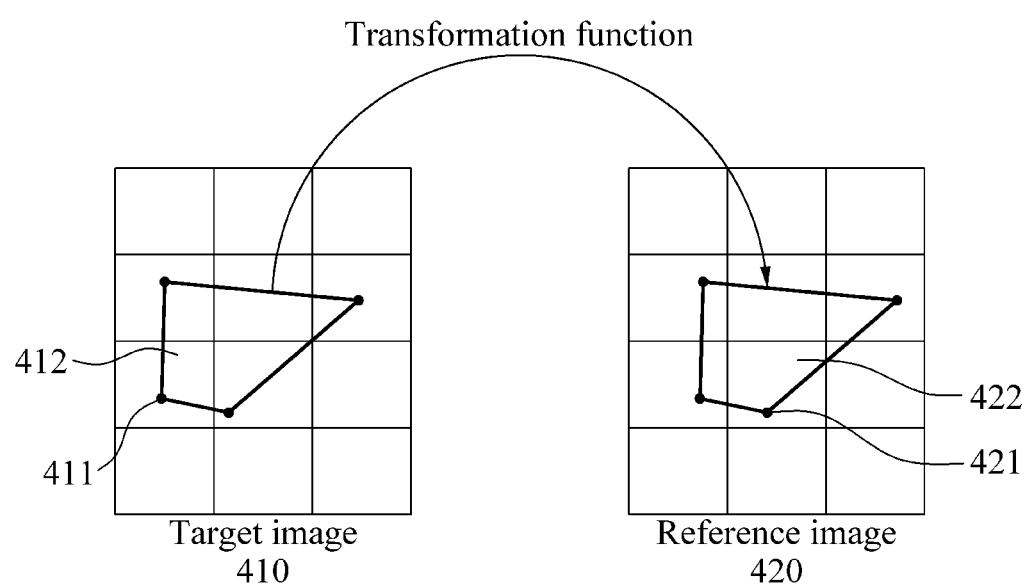
FIG. 4 illustrates an example of determining a candidate initial plane.

FIG. 4 illustrates an example of determining a candidate initial plane. Referring to the example of FIG. 4, a plane estimation apparatus extracts a feature point 421 corresponding to a reference feature point 411 of a target image 410 from a reference image 420. The plane estimation apparatus determines a first plane 412 based on the reference feature point 411 and determines a second plane 422 corresponding to the first plane 412 based on the feature point 421.

According to the example of FIG. 4, the plane estimation apparatus determines a transformation function of the first plane 412 and the second plane 422. For example, the plane estimation apparatus determines the transformation function based on the reference feature point 411 and the feature point 421. The plane estimation apparatus projects first feature points of the first plane 412 onto the second plane 422 based on the determined transformation function, thereby determining corresponding projection points on the second plane 422. Accordingly, the second plane 422 includes second feature points corresponding to the first feature points, derived using the transformation function. Thus, a first feature point is a feature point on the first plane 412. Likewise, a second feature point is a feature point on the second plane 422. The first feature point and the second feature point indicate the same object, and are also referred to as a corresponding pair of feature points. Thus, the second feature point is a corresponding point of the first feature point. A projection point of the first feature point is obtained by projecting the first feature point onto the second plane 422 based on the transformation function. Thus, the second feature point and the projection point differ from each other, in such an example.

The plane estimation apparatus determines the first plane 412 to be a candidate initial plane based on a difference between the projection point of the first feature point and the second feature point. Here, the difference is a positional difference or a distance between the first feature point and the second feature point. A transformation result based on the transformation function includes coordinate values of the projection points. The plane estimation apparatus compares differences between coordinate values of the second feature points and corresponding coordinate values of the projection points based on the transformation result to a threshold. When each of the differences between the points under consideration is less than the threshold, the plane estimation apparatus determines the first plane 412 to be the candidate initial plane.

Referring back to the example of FIG. 2, in operation 207, the plane estimation apparatus determines whether repetition is required, with respect to steps 205 and 206, in order to select reference feature points in step 205 and determine a candidate initial plane in step 206. To acquire an optimal initial plane, the plane estimation apparatus prepares a plurality of candidate initial planes and estimates the initial plane from among the plurality of candidate initial planes. In this example, operations 205 and 206 are repetitively performed to prepare the plurality of candidate initial planes for consideration. As a criterion for determining how many times to repeat these operations, a total number of repetition times K is determined or a number of required candidate initial planes L is determined. When K is determined, operations 205 and 206 are performed K times and the results of performing operations 205 and 206 such a number of times are used later in the example of FIG. 2. When L is determined, operation 205 and 206 are performed repetitively until L candidate initial planes are determined. When additional repetition is required, operation 205 is performed. When the repetition is not required, operation 208 is performed.

In operation 208, the plane estimation apparatus estimates the initial plane. The plane estimation apparatus determines a candidate initial plane having a greatest number of inliers from among candidate initial planes to be the initial plane. An inlier is, for example, a feature point located on the same plane as the candidate initial plane.

In operation 209, the plane estimation apparatus classifies each of the feature points in the target image as being an inlier or an outlier.

Figure 5:
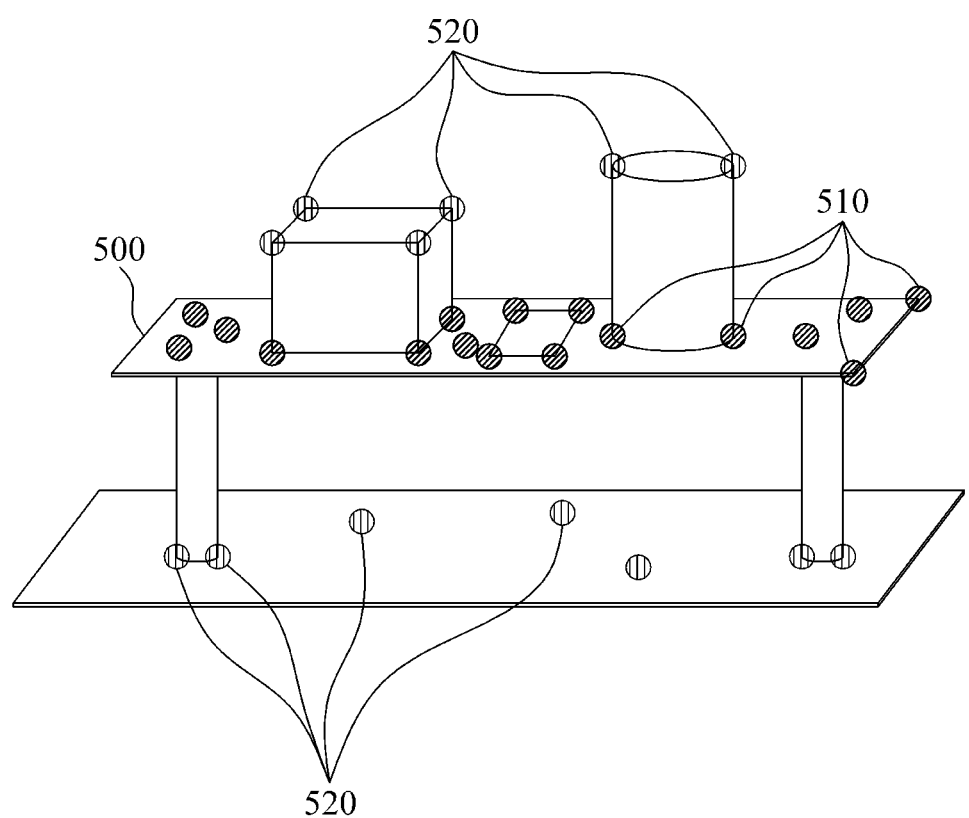
FIG. 5 illustrates an example of an inlier and an outlier.

FIG. 5 illustrates an example of an inlier and an outlier. Referring to FIG. 5, when a reference plane 500 is present, an inlier 510 is located on the same plane as the reference plane 500 and an outlier 520 is located on a plane different from the reference plane 500. A plane estimation apparatus generates a transformation result by applying a transformation function to a predetermined feature point located in a target image. When the transformation result is close to a corresponding point in a reference image, the plane estimation apparatus classifies the feature point as an inlier. When the transformation result is not close to the corresponding point in the reference image, the plane estimation apparatus classifies the feature point as an outlier. Thus, whether the transformation result is close to the corresponding point is determined based on a threshold used to determine an initial plane. For example, such a threshold may be predetermined, depending on desired operational characteristics of the plan estimation apparatus.

In operation 210, the plane estimation apparatus selects boundary grid cells from the plurality of grid cells of the target image, based on a distribution of the inliers and the outliers, as identified above. A boundary grid cell is a cell that is determined to be highly likely to include a boundary of a plane from among grid cells. When a predetermined grid cell includes both inliers and outliers, the grid cell is highly likely to have the boundary of the plane. Accordingly, such a grid cell is a boundary grid cell. Also, when one of two neighboring grid cells includes an inlier and the other neighboring grid cell includes an outlier, the two neighboring grid cells are highly likely to contain the boundary of the plane somewhere within their area. Thus, the boundary grid cells include any one or any combination of any two or more of a first-type grid cell including the inlier and the outlier, a second-type grid cell in contact with a grid cell including the outlier from among grid cells including the inlier, and a third-type grid cell in contact with a grid cell including the inlier from among grid cells including the outlier.

In operation 211, the plane estimation apparatus estimates a boundary line in the boundary grid cells. The boundary line is estimated based on any one or any combination of any two or more of depth information, intensity information, and color information of pixels in the boundary grid cells. The intensity information corresponds to an intensity of light in a pixel. The depth information is calculated based on a disparity between matching feature points. Sources of such depth information are discussed further, above. For example, the boundary of the plane is highly likely to be present in a pixel area with a significant change in color, a pixel area with a significant change in intensity, and/or a pixel area with a significant change in depth. All of these phenomena correspond to areas of physical subjects with proximity to planar boundaries. Thus, the plane estimation apparatus estimates the boundary line in the boundary grid cells based on the aforementioned information.

In operation 212, the plane estimation apparatus estimates the expanded plane, based on the boundary line. The plane estimation apparatus estimates a plane determined by the boundary line to be the expanded plane. The plane estimation apparatus outputs boundary information indicating the expanded plane. The boundary information includes, for example, coordinate values of pixels corresponding to the boundary line of the expanded plane.

Figure 6:
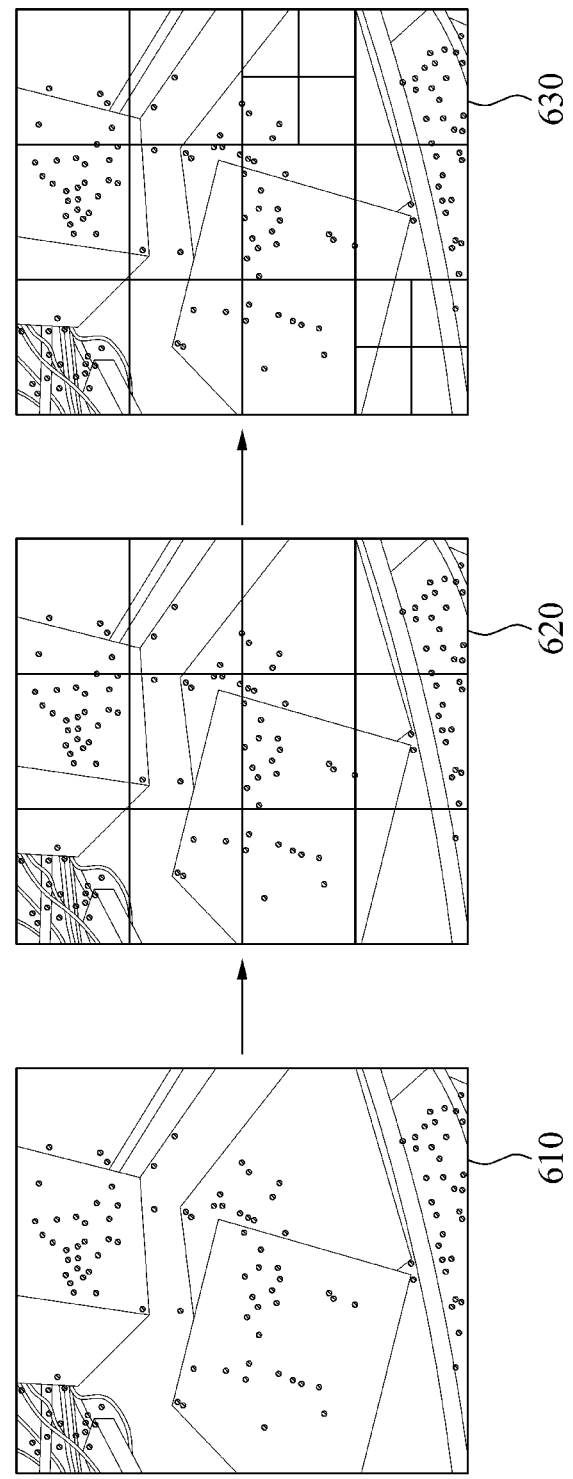
FIG. 6 illustrates an example of a process of gridization.

FIG. 6 illustrates an example of a process of gridization. Referring to the example of FIG. 6, a target image 620 is obtained by dividing a target image 610 into a plurality of grid cells. Likewise, a subsequent target image 630 is obtained by dividing a portion of grid cells in the target image 620 into multiple grid cells.

Figure 7:
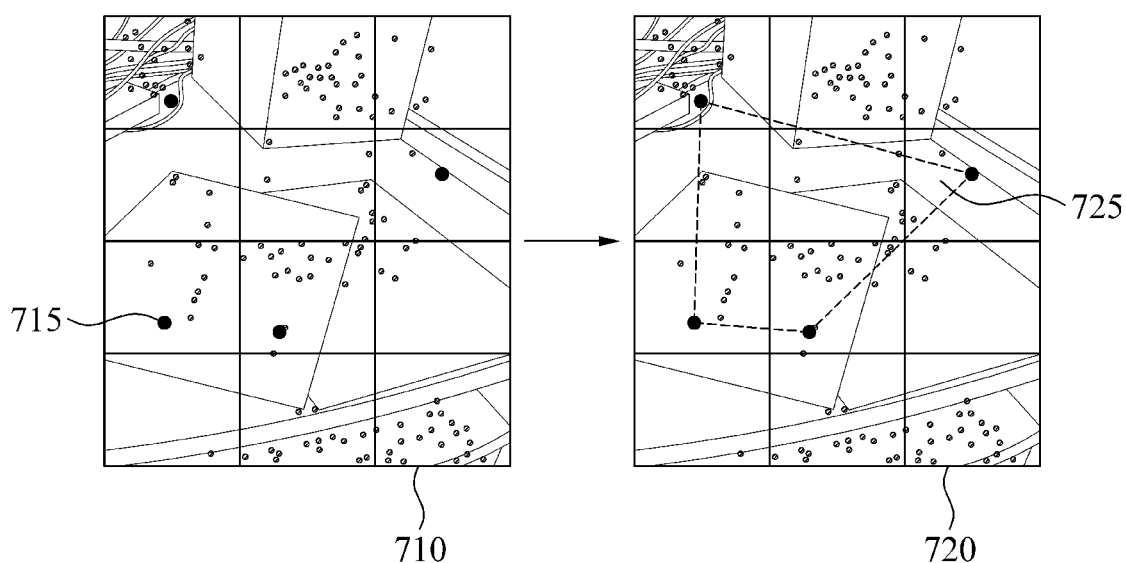
FIG. 7 illustrates an example of estimating an initial plane.

FIG. 7 illustrates an example of estimating an initial plane. Referring to the example of FIG. 7, a reference feature point 715 is selected from a plurality of feature points included in a target image 710. An initial plane 725 is estimated in a target image 720 based on the reference feature point 715. The initial plane 725 is, for example, a plane including a greatest number of inliers from among a plurality of candidate initial planes. Generation of such candidate initial planes is discussed, further, above.

Figure 8:
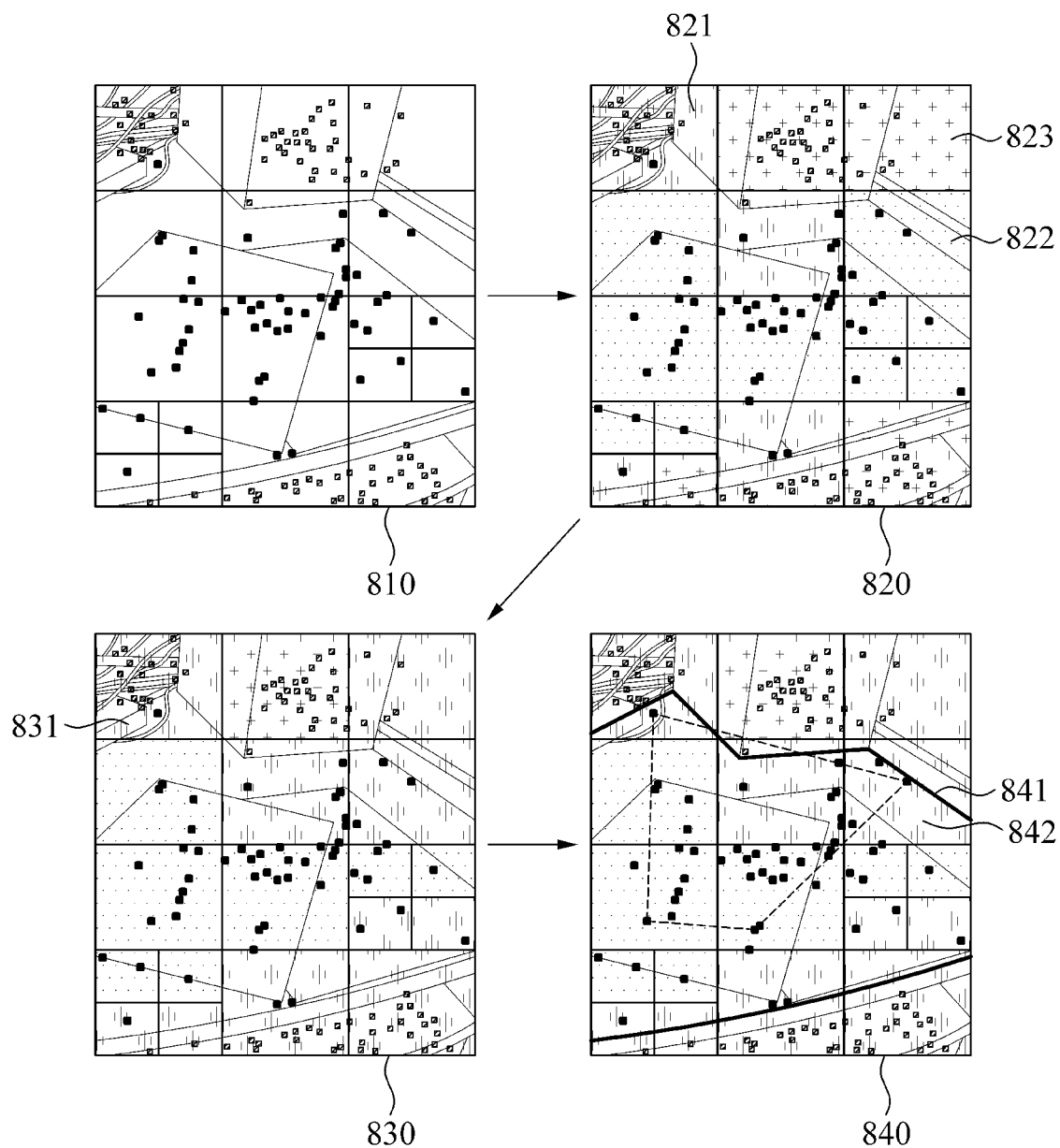
FIG. 8 illustrates an example of estimating an expanded plane.

FIG. 8 illustrates an example of estimating an expanded plane. Referring to the example of FIG. 8, in a target image 810, feature points are classified as being an inlier or an outlier as indicated by a solid dot and a semi-solid dot, respectively.

Boundary grid cells are selected from a target image 820. As discussed further above, there are three types of grid cells associated with being a boundary grid cell. A first-type grid cell 821 including both an inlier and an outlier, a second-type grid cell 822 in contact with a grid cell including an outlier from among grid cells including an inlier, and a third-type grid cell 823 in contact with a grid cell including an inlier from among grid cells including an outlier are selected as being the boundary grid cells. With respect to multiple grid cells, whether each of the multiple grid cells belongs to the boundary grid cells is determined. In the target image 820, patterns of grid cells indicate a grid cell including an inlier and an outlier, a grid cell including only inliers, and a grid cell including only outliers. Accordingly, a target image 830 includes a boundary grid cell 831 selected based on the target image 820.

In the target image 830, patterns indicate a boundary grid cell 831 and a grid cell not including a boundary. A target image 840 includes a boundary line 841 estimated based on the boundary grid cell 831 and an expanded plane 842 estimated based on the boundary line 841.

Figure 9:
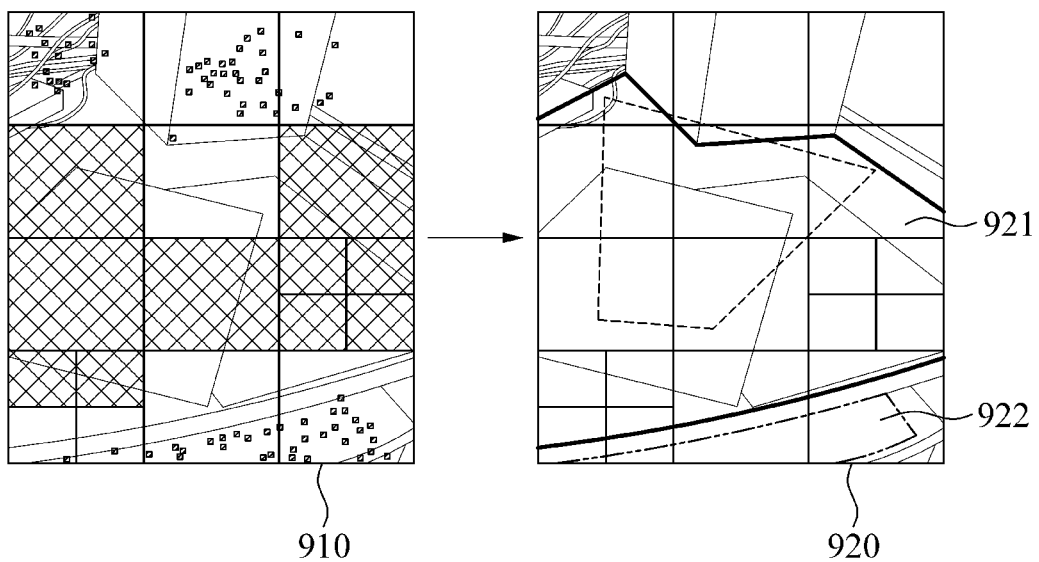
FIG. 9 illustrates an example of estimating multiple planes.

FIG. 9 illustrates an example of estimating multiple planes. A plane estimation apparatus estimates multiple planes. The plane estimation apparatus estimates a second plane based on data previously used to estimate a first plane. The plane estimation apparatus removes an inlier of the first plane from feature points of a target image and deactivates grid cells including the inlier of the first plane from among grid cells of the target image. A target image 910 is an image upon which an inlier removing operation and a deactivating operation are performed. Depending on aspects of an example, either the inlier removing operation or the deactivating operation may be performed, according to the particular circumstances of the example.

The plane estimation apparatus estimates the second plane based on remaining feature points and activated grid cells. In such an example, the remaining feature points are feature points that remain after the inlier of the first plane is removed, and correspond to outliers of the first plane. The second plane is estimated through the same process as a process of estimating the first plane, with respect to the appropriate feature points.

The plane estimation apparatus selects grid cells from the activated grid cells and selects reference feature points from the selected grid cells. The plane estimation apparatus estimates a second initial plane based on the selected reference feature points and classifies each of the remaining feature points as being an inlier or an outlier associated with the second initial plane. The plane estimation apparatus selects second boundary grid cells from the activated grid cells based on a distribution of the inliers and the outliers associated with the second initial plane and estimates a second expanded plane based on the second boundary grid cells.

A target image 920 includes a first plane 921 estimated in advance and a second plane 922 derived during operation. Although two planes are estimated in the example of FIG. 9, the target estimation apparatus may also estimate three or more planes based on performing the foregoing operations.

Figure 10:
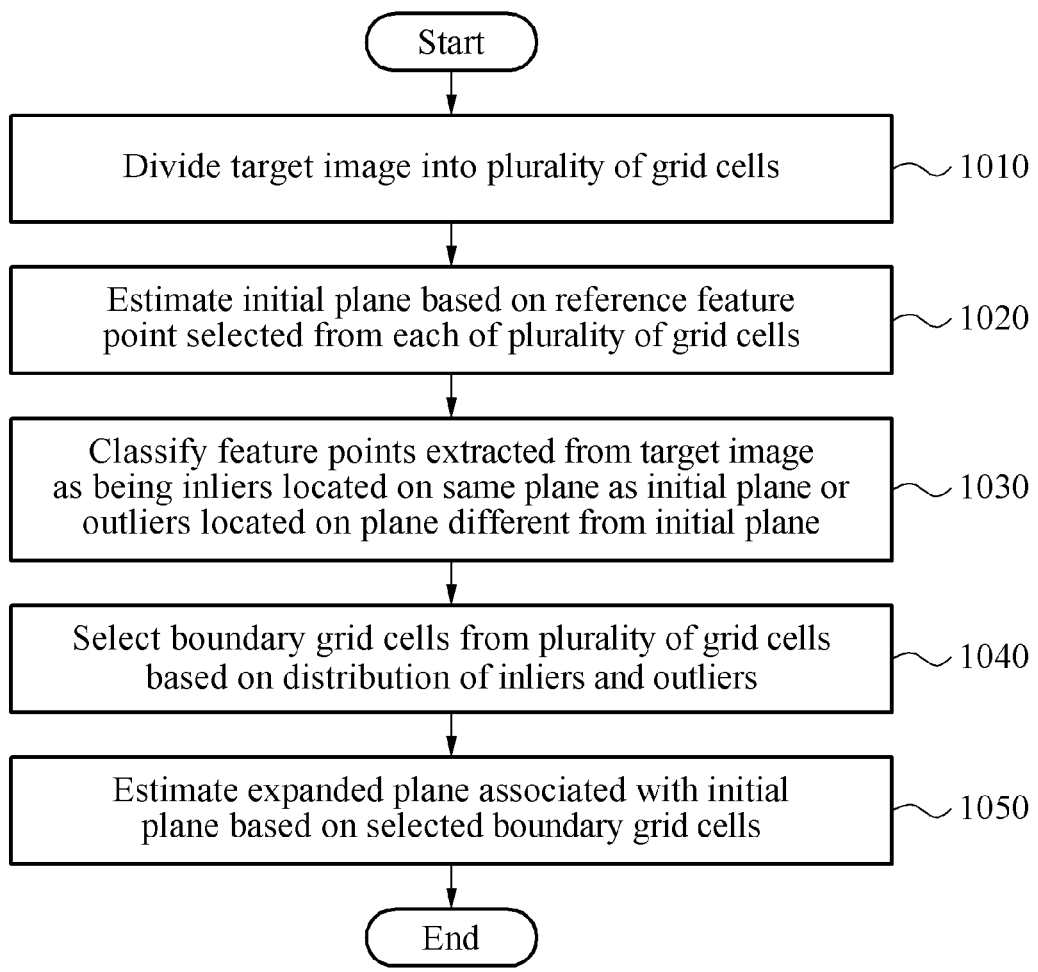
FIG. 10 illustrates an example of a plane estimation method.

FIG. 10 illustrates an example of a plane estimation method. Referring to the example of FIG. 10, in operation 1010, a plane estimation apparatus divides a target image into a plurality of grid cells. In operation 1020, the plane estimation apparatus estimates an initial plane based on a reference feature point selected from each of the plurality of grid cells. In operation 1030, the plane estimation apparatus classifies each feature point extracted from the target image as being an inlier located on the same plane as the initial plane or an outlier located on a plane different from the initial plane. In operation 1040, the plane estimation apparatus selects boundary grid cells from the plurality of grid cells based on a distribution of the inliers and the outliers. In operation 1050, the plane estimation apparatus estimates an expanded plane associated with the initial plane based on the selected boundary grid cells. The description of FIGS. 1 through 9 is also applicable with respect to FIG. 10 and thus, repeated description of the plane estimation method is omitted for brevity. However, the description of FIGS. 1 to 9 is not to be taken as limiting, and FIG. 10 may also pertain to appropriate variants and equivalents of what is portrayed with respect to FIGS. 1 to 9.

Figure 11:
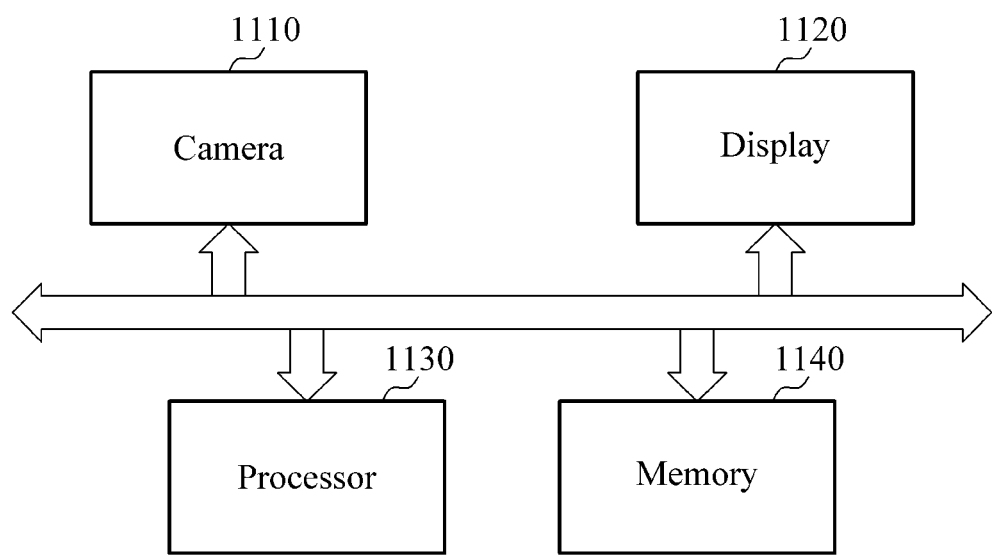
FIG. 11 illustrates an example of an apparatus with plane estimating.

FIG. 11 illustrates an example of a plane estimation apparatus. Referring to FIG. 11, a plane estimation apparatus 1100 includes a camera 1110, a display 1120, a processor 1130, and a memory 1140. For example, the plane estimation apparatus 1100 of FIG. 11 may correspond to the plane estimation apparatus 100 of FIG. 1 and may provide an example of how the plane estimation apparatus 100 of FIG. 1 is implemented and structured, but examples are not limited to the example shown in FIG. 11. In one example, the plane estimation apparatus 1100 includes the processor 1130 and the memory 1140, but excludes the camera 1110 and/or the display 1120.

The camera 1110 captures a real world image and generates a corresponding input image. The generated input image is then provided to the processor 1130 and the memory 1140 for analysis. Depending on examples, the camera 1110 includes a mono camera configured to generate a mono image, a stereo image camera configured to generate a stereo image, or a color camera configured to generate a color image and a depth camera configured to generate a depth image. These various types of camera function to provide the images used to portray a real world scene and supply depth information used in identifying planes in the real world scene.

The memory 1140 stores data and an algorithm used for plane estimation, and may also store an instruction to be read by the processor 1130. The processor 1130 reads the instruction stored in the memory 1140, the instruction is then executed in the processor 1130, which causes the processor 1130 to perform or implement operations for the plane estimation, as discussed above. For example, the processor 1130 may be caused to perform or implement the operations for the plane estimation discussed above in the discussion of FIG. 10. Accordingly, the processor 1130 divides a target image into a plurality of grid cells, estimates an initial plane based on a reference feature point selected from each of the plurality of grid cells, classifies feature points extracted from the target image as inliers located on the same plane as the initial plane or outliers located on a plane different from the initial plane, selects boundary grid cells from the plurality of grid cells based on a distribution of the inlier and the outlier, and estimates an expanded plane associated with the initial plane based on the selected boundary grid cells. The processor 1130 generates boundary information corresponding to the estimated expanded plane.

The display 1120 displays information associated with the plane estimation in accordance with a command received from the processor 1130. For example, the display 1120 displays plane information overlapping an input image in which a real world scene appears. In such an example, the plane information includes a boundary of a plane in the input image, a texture applied to the plane in the input image, and a virtual object on the plane in the input image. Accordingly, the plane information may show an AR scene and facilitate the display of a virtual object, placed and/or superimposed in an actual scene. For example, the processor 1130, as discussed above, may be caused to perform or implement operations directed to examples in VR, AR, and other location-based fields, such as in connection with directing an AI robot, as discussed further, above.

The plane estimation apparatus 1100 is implemented as at least a portion of an electronic device. The electronic device may be, for example, a computing device such as a personal computer (PC), a portable device such as a smartphone, a tablet PC, and a laptop computer, a display device such as a television (TV) and a head up display (HUD), or a wearable device such as smart glasses, a smart watch, a smart band, and a smart wear. The plane estimation apparatus 1100 is connected to an external device, for example, a PC or a network, through an input and output device to perform any necessary data exchange.

The apparatuses, units, modules, devices, and other components in FIGS. 1 and 11, such as the plane estimation apparatus 100, camera 1110, display 1120, processor 1130, and memory 1140, that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of estimating a plane, the method comprising:
   dividing a target image into a plurality of grid cells;
   estimating an initial plane based on reference feature points comprising a reference feature point selected from each of the plurality of grid cells;
   classifying each feature point of feature points extracted from the target image as being an inlier located on the same plane as the initial plane or an outlier located on a plane different from the initial plane;
   selecting boundary grid cells from the plurality of grid cells based on a distribution of the inliers and the outliers from among the feature points; and
   estimating an expanded plane associated with the initial plane based on the selected boundary grid cells for use in identifying boundaries of a planar surface presented in a scene corresponding to the target image.

2. The method of claim 1, wherein the scene corresponding to the target image is a scene in an augmented reality.

3. The method of claim 1, further comprising displaying a virtual object on the planar surface in the scene corresponding to the target image based on the expanded plane.

4. The method of claim 1, further comprising:
   extracting the feature points from the target image; and
   controlling a distribution of the extracted feature points.

5. The method of claim 4, wherein the controlling of the distribution of the extracted feature points comprises:
   identifying a grid cell having an unbalanced distribution from the plurality of grid cells;
   dividing the identified grid cell into multiple grid cells; and
   re-extracting feature points from the multiple grid cells.

6. The method of claim 1, wherein the estimating of the initial plane comprises:
   sampling grid cells from among the plurality of grid cells;
   selecting a reference feature point from each of the sampled grid cells; and
   estimating, as the initial plane, a plane having the selected reference feature points as vertices.

7. The method of claim 1, wherein the estimating of the initial plane comprises:
   determining a first plane based on the reference feature points comprising a reference feature point selected from each of the plurality of grid cells;
   determining a second plane based on feature points of a reference image corresponding to the reference feature points;
   determining a transformation function between the first plane and the second plane;
   determining projection points on the second plane by projecting first feature points on the first plane onto the second plane based on the transformation function; and
   estimating the first plane as the initial plane based on differences between the determined projection points and second feature points corresponding to the first feature points on the second plane.

8. The method of claim 7, wherein the target image corresponds to a first frame from among a plurality of frames of an input image, and the reference image corresponds to a second frame from among the plurality of frames of the input image.

9. The method of claim 7, wherein the target image corresponds to an image captured at a first capturing position of a stereo image, and the reference image corresponds to an image captured at a second capturing position of the stereo image.

10. The method of claim 1, wherein the boundary grid cells comprise any one or any combination of any two or more of a first-type grid cell including an inlier and an outlier, a second-type grid cell in contact with a grid cell including an outlier from among grid cells including an inlier, and a third-type grid cell in contact with a grid cell including an inlier from among grid cells including an outlier.

11. The method of claim 1, wherein the estimating of the expanded plane comprises:
   estimating a boundary line in the selected boundary grid cells; and
   estimating the expanded plane based on the estimated boundary line.

12. The method of claim 11, wherein the boundary line is estimated based on any one or any combination of any two or more of depth information, intensity information, and color information of pixels in the selected boundary grid cells.

13. The method of claim 1, further comprising:
   removing each inlier from the target image; and
   deactivating grid cells including each inlier from among the plurality of grid cells.

14. The method of claim 13, further comprising:
   estimating a second initial plane based on remaining feature points excluding each removed inlier;
   classifying each of the remaining feature points as being an inlier or an outlier associated with the second initial plane;
   selecting second boundary grid cells from activated grid cells based on a distribution of the inliers and the outliers associated with the second initial plane; and
   estimating a second expanded plane based on the second boundary grid cells.

15. The method of claim 1, further comprising:
   estimating a second initial plane based on the outliers;
   selecting second boundary grid cells based on a distribution of inliers and outliers associated with the second initial plane; and
   estimating a second expanded plane based on the second boundary grid cells.

16. A non-transitory computer-readable storage medium storing instructions that, when executed by a processor, cause the processor to perform the method of claim 1.

17. An apparatus for estimating a plane, the apparatus comprising:
a processor configured to
divide a target image into a plurality of grid cells,
estimate an initial plane based on reference feature points comprising a reference feature point selected from each of the plurality of grid cells,
classify feature points extracted from the target image as being an inlier located on the same plane as the initial plane or an outlier located on a plane different from the initial plane,
select boundary grid cells from the plurality of grid cells based on a distribution of the inliers and the outliers from among the feature points, and
estimate an expanded plane associated with the initial plane based on the selected boundary grid cells for use in identifying a planar surface presented in a scene corresponding to the target image.

18. The apparatus of claim 17, further comprising a memory storing instructions, which when executed by the processor, cause the processor to implement the dividing of the target image, the estimation of the initial plane, the classification of the feature points, the selection of the boundary grid cells, and the estimation of the expanded plane.

19. The apparatus of claim 17, wherein the scene corresponding to the target image is a scene in an augmented reality.

20. The apparatus of claim 17, wherein the processor is further configured to display a virtual object on the expanded plane in the scene corresponding to the target image based on boundaries of the expanded plane.

21. The apparatus of claim 17, wherein the processor is configured to estimate the initial plane by:
determining a first plane based on the reference feature points comprising a reference feature point selected from each of the plurality of grid cells;
determining a second plane based on feature points of a reference image corresponding to the reference feature points;
determining a transformation function between the first plane and the second plane;
determining projection points on the second plane by projecting first feature points on the first plane onto the second plane based on the transformation function; and
estimating the first plane as the initial plane based on differences between the determined projection points and second feature points corresponding to the first feature points on the second plane.

22. The apparatus of claim 17, wherein the boundary grid cells comprise any one or any combination of any two or more of a first-type grid cell including an inlier and an outlier, a second-type grid cell in contact with a grid cell including an outlier from among grid cells including the inlier, and a third-type grid cell in contact with a grid cell including an inlier from among grid cells including the outlier.

23. The apparatus of claim 17, wherein the processor is configured to estimate the expanded plane by:
estimating a boundary line in the selected boundary grid cells; and
estimating the expanded plane based on the estimated boundary line.

24. The apparatus of claim 23, wherein the boundary line is estimated based on any one or any combination any two or more of depth information, intensity information, and color information of pixels in the selected boundary grid cells.

25. A processor-implemented method of estimating a plane, the method comprising:
estimating an initial plane based on reference feature points, comprising a reference feature point selected from each of a plurality of grid cells, wherein the grid cells are obtained by division of a target image;
selecting boundary grid cells from the plurality of grid cells based on a distribution of inliers and the outliers classified from among feature points extracted from the target image, wherein inliers are located on the same plane as the initial plane and outliers are located on a plane different from the initial plane; and
estimating an expanded plane associated with the initial plane based on the selected boundary grid cells for use in identifying boundaries of a planar surface presented in a scene corresponding to the target image.

* * * * *